June 7, 1932. H. P. MacGREGOR 1,861,541
CLOSED END CYLINDRICAL ROTOR VALVE
Filed May 20, 1929 2 Sheets-Sheet 1

Inventor
HALBERT P. MacGREGOR,
By Toulmin + Toulmin
Attorneys

Patented June 7, 1932

1,861,541

UNITED STATES PATENT OFFICE

HALBERT P. MacGREGOR, OF CINCINNATI, OHIO, ASSIGNOR, BY MESNE ASSIGNMENTS, TO THE LUNKENHEIMER COMPANY, OF CINCINNATI, OHIO, A CORPORATION OF OHIO

CLOSED END CYLINDRICAL ROTOR VALVE

Application filed May 20, 1929. Serial No. 364,350.

This invention relates to valves and particularly to lubricated valves.

It is an object of my invention to provide an unbalanced, lubricated valve in which the plug will be closed or substantially closed at both ends, but means is provided either by reason of a loose fit or a passageway through or around one end of the plug for the line pressure so that the plug will move in one direction only against the lubricant in a lubricant chamber located adjacent the other end of the plug causing that lubricant to travel from the chamber around the plug and around that end of the plug on which such pressure is being applied on both sides.

It is a further object to provide a plug, preferably of cylindrical form, which forms with the casing at the end of the plug, which carries a plug stem extending out of the casing, a lubricant chamber. The line pressure is utilized to act upon the exposed face of the stem carrying end and upon both faces of the other end of the plug thereby securing the maximum of area upon which the line pressure can operate to move the plug against the lubricant to distribute the lubricant making the valve self-lubricated.

Referring to the drawings.

Figure 1:
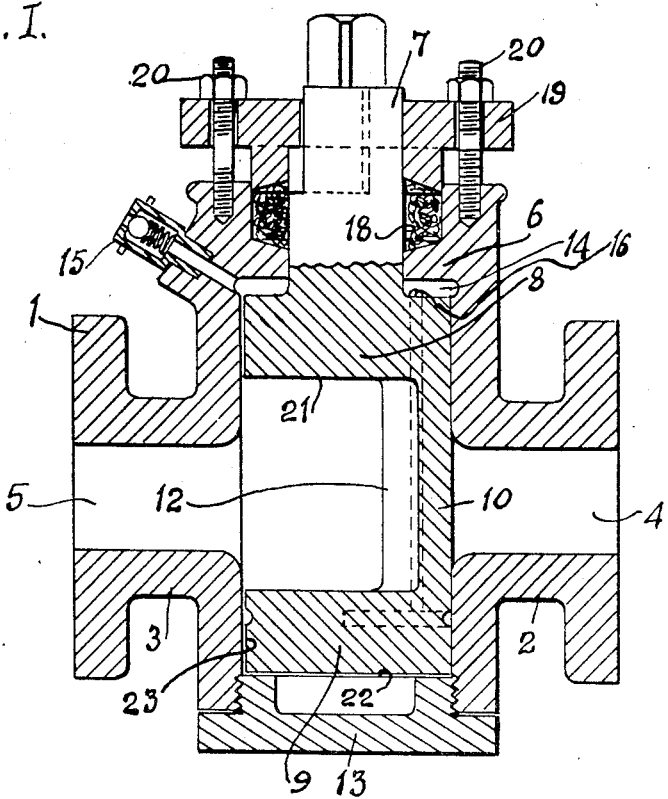
Fig. 1 is a section through the preferred form. The fit of the plug is exaggerated in order to show the loose character of the fit.
Figure 2:
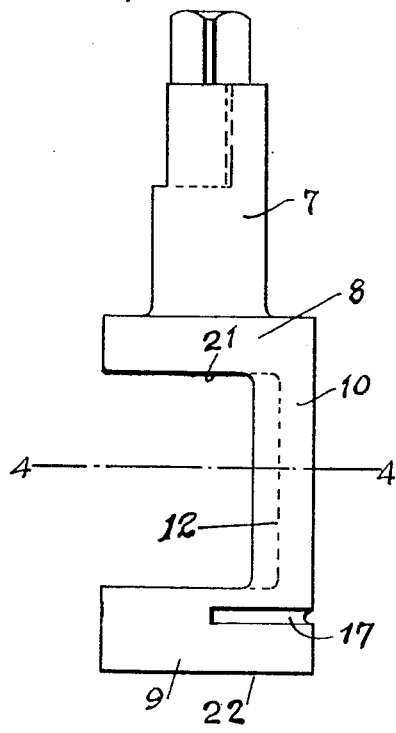
Fig. 2 is a side elevation of the plug looking at the apertured side.
Figure 3:
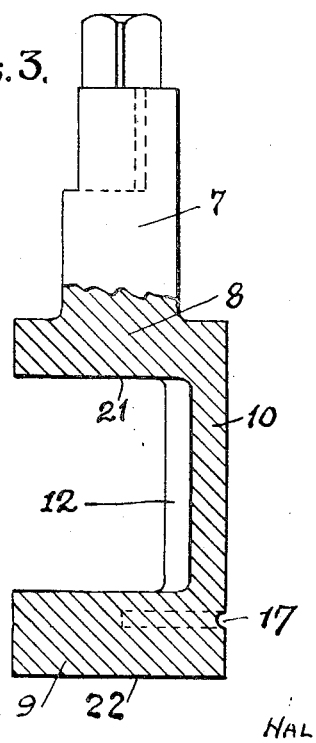
Fig. 3 is a detail vertical section therethrough on the line 3—3 of Fig. 1.
Figure 4:
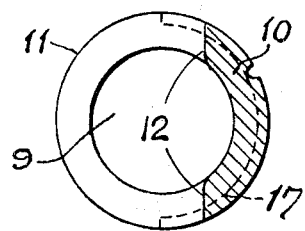
Fig. 4 is a horizontal section on the line 4—4 of Fig. 2.

Referring to the drawings in detail, 1 is a cylindrical casing having horizontally disposed portions 2 and 3 with passageways 4 and 5 therethrough for conveying the line fluid or gas. An apertured cover 6 is provided through which extends the stem 7 of the rotating plug which is composed of ends 8 and 9 joined together by the spaced vertical side walls 10 and 11 between which is a passageway 12 for the passage of line pressure or fluid. This plug is preferably cylindrical. Its lower end 9 normally rests upon a screw plug 13 threaded into the casing 1. The upper end 8 is spaced from the inside of the cover portion of casing 6 to form a chamber 14 for lubricant which is supplied to the chamber through the lubricant supply fitting 15. Lubricant is distributed from this chamber through the vertical grooves 16 and the horizontal grooves 17 partly surrounding the end 9 of the rotor.

Surrounding the stem 7 is a packing 18, a retaining cover 19 for the packing retained in position by the bolts 20.

It will be noted from Fig. 1 that the fit between the rotor and the casing is loose in the sense that there is such sufficient clearance for the line pressure to work along the sides of the rotor ends 9 and beneath it so that the line pressure will exert itself upon the whole area of the bottom end 22 of the rotor plug 9. This line pressure will also exert itself upon the underside 21 of the upper end 8 of the rotor. As the stem 7 is exposed to the outside atmosphere, it is obvious that the higher line pressure acting upon the surface 21 will also tend to move the plug vertically in cooperation with the pressure of the under surface 22 of the lower end 9, the pressure having worked beneath the casing and around surface 23 of the lower end 9.

Thus the line pressure is utilized to move the plug in one direction only against the single lubricant chamber 14 to force the lubricant therefrom through the lubricant distribution grooves. This prevents the valve from sticking which facilitates its rotation and insures its lubrication.

Figure 5:
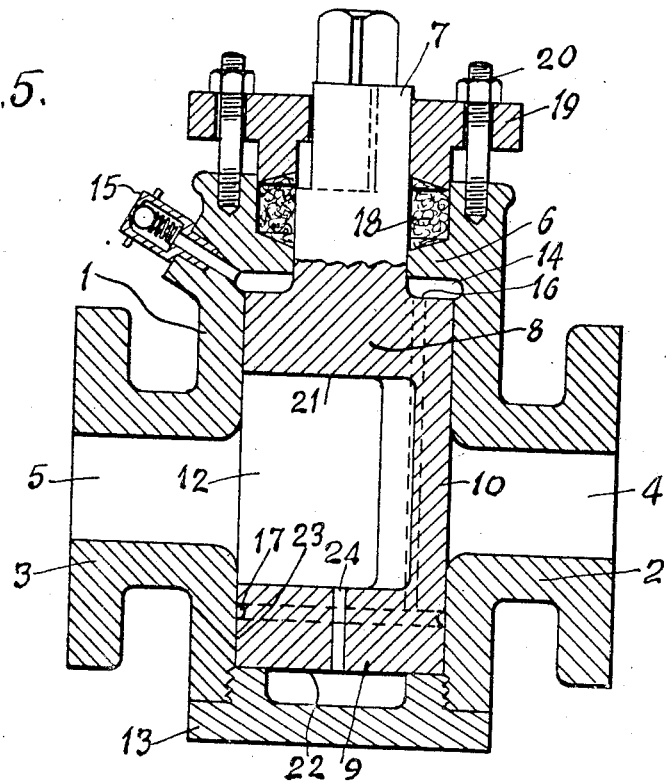
Fig. 5 is a section through the valve showing a modification where the plug is a tight fit but is provided with a center aperture through one end for admission of line pressure behind the plug.

Referring to Fig. 5, when it is desired to have a close fit between the plug and the casing, then a hole 24 may be drilled through the bottom end 9 of the plug to admit pressure to the surface 22 for the same purpose.

Figure 6:
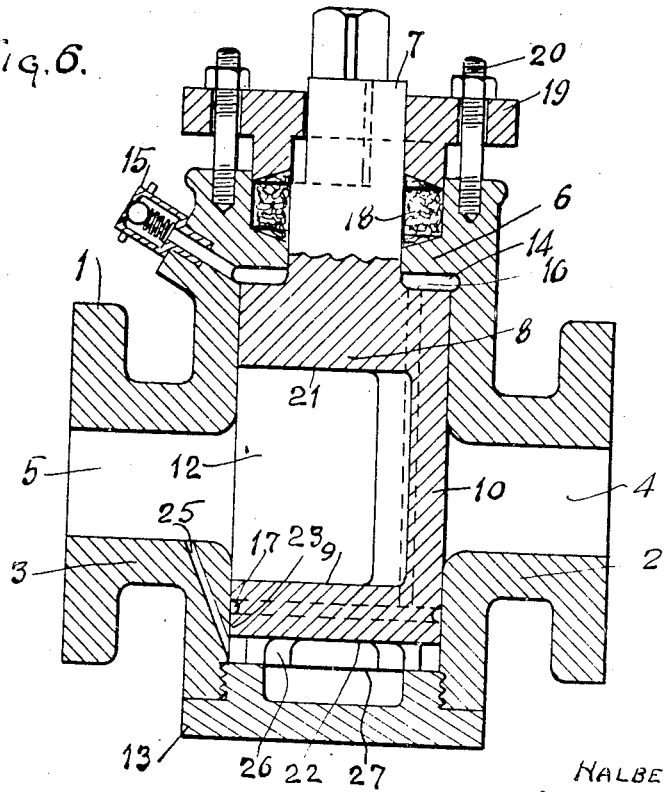
Fig. 6 is a similar view showing a passageway for conveying line pressure through the casing to a point behind the plug.

In Fig. 6, a passageway 25 has been drilled to give access of the line pressure to the surface 22 of the lower end 9. In such case the lower end of the plug is provided with a series of spaced lugs which act as stops to prevent the rotor plug from sealing the by-pass port. These lugs 26 rest upon the shoulder 27 of the screw plug 13.

It will be understood that I desire to comprehend within my invention and within the scope of my claims such modifications as may be fairly comprehended within such claims and invention due to necessary modifications to adapt my invention to varying conditions of use and to varying purposes.

I claim:

1. In a valve, a casing, a rotor plug having an aperture therethrough registering with inlet and exit apertures in the casing, said aperture being formed by a top, bottom and single side wall adapted to close one of the casing apertures there being a space between one end of said plug and said casing to form a lubricant chamber, said plug fitting in said casing in such a manner that the line pressure will engage all sides of the plug except that forming one wall of the lubricant chamber whereby the plug moves bodily toward the lubricant chamber and the line pressure presses the side wall of the plug adjacent the casing surrounding the exit aperture therein.

2. In combination, a casing, a rotor plug therein spaced from said casing at one end to form a lubricant chamber therebetween, said plug being closed at both ends with one side cut away and so mounted within said casing that the line pressure will act upon both sides of one end and one side of the other end and the inside of the cut away side.

3. In combination, a casing, a rotor plug therein spaced from said casing at one end to form a lubricant chamber therebetween, said plug being closed at both ends with a side cut away and so mounted within said casing that the line pressure will act upon both sides of the one end, one side of the other end and against the inside of the cut away side, and a stem projecting from the other side of last-mentioned end to a point outside of the casing.

4. In combination, a casing with inlet and outlet apertures, a rotor plug having a stem, spaced ends, one of which carries said stem, means connecting said ends forming a rotor side wall less than the diameter of the rotor to permit line pressure on the inside of the rotor when it is in closed position, said stem end being spaced from the casing to form a lubricant chamber, the other end loosely fitting in said casing so that line pressure may engage all sides and ends of the rotor except the portion forming a wall of the lubricant chamber and means for distributing lubricant from said chamber between said casing and said rotor on the side adjacent the casing outlet aperture when the rotor is in closed position.

5. In combination, a casing, having a passageway therethrough, a rotating plug loosely mounted therein having a spaced top and bottom and a side wall on one side, a detachable plug in said casing, retaining said rotating plug in position, a stem projecting from said rotating plug out of said casing, a lubricant chamber located between one end of said casing and one end of said rotating plug adjacent said stem, space between the bottom of the rotating plug and the casing whereby line pressure will pass and move said plug bodily against the lubricant in said lubricant chamber for distributing it between the plug and said casing.

6. In combination, a casing with an inlet and outlet aperture, a plug loosely fitted therein having ends and a single side wall on one side adapted to close the outlet aperture in the casing, one end of said plug being spaced from the casing to contain lubricant and means communicating therewith for distributing lubricant therefrom between the casing and the side walls of the rotor and about a portion of the other end of the rotor adjacent the outlet aperture in the casing whereby line pressure will operate on the inside of the plug to move it against the lubricant and will move the plug against the casing toward the outlet aperture so that line pressure may enter between the end of the plug away from the outlet aperture to enter beneath it.

7. In combination, a casing with an inlet and outlet aperture, a cylindrical plug fitted therein for transverse and longitudinal movement of the plug comprising ends and a connecting side wall on one side of said ends, said casing and plug being arranged to form between one end thereof a lubricant chamber, a stem on said plug extending out of said casing through said chamber.

8. In combination, a casing with an inlet and outlet aperture, a cylindrical plug fitted therein for transverse and longitudinal movement of the plug comprising ends and a connecting side wall on one side of said ends, said casing and plug being arranged to form between one end thereof a lubricant chamber, a stem on said plug extending out of said casing through said chamber, said casing having formed at its other end a space between the end of the plug and the casing into which line pressure can enter to move the plug against the lubricant in the lubricant chamber.

9. In combination, a casing having inlet and outlet apertures, an unbalanced rotor plug therein having spaced ends and a single connecting side wall on one side thereof loosely fitted within said casing and having its ends spaced from the casing to form a lubricant chamber at one end and a pressure chamber at the other.

10. In combination, a casing having inlet and outlet apertures, an unbalanced rotor plug therein having spaced ends and a single connecting side wall on one side thereof loosely fitted within said casing and having its ends spaced from the casing to form a lubricant chamber at one end and a pressure chamber at the other, a stem mounted on that end of the rotor plug which forms with the casing a lubricant chamber, said stem projecting out of the casing.

11. In combination, a casing having inlet and outlet apertures, an unbalanced rotor plug therein having spaced ends and a single connecting side wall on one side thereof loosely fitted within said casing and having its ends spaced from the casing to form a lubricant chamber at one end and a pressure chamber at the other, a stem mounted on that end of the rotor plug which forms with the casing a lubricant chamber, said stem projecting out of the casing, said plug in the casing having means for conveying lubricant from the lubricant chamber between the casing and the side wall of the plug and thence partially around the other end of the plug on the side toward the outlet aperture whereby the side of said end of the plug away from said aperture will be free from lubricant to permit the entrance of line pressure behind that end of the plug to move it against the lubricant in the lubricant chamber.

In testimony whereof, I affix my signature.

HALBERT P. MacGREGOR.